United States Patent Office 2,741,323
Patented Apr. 10, 1956

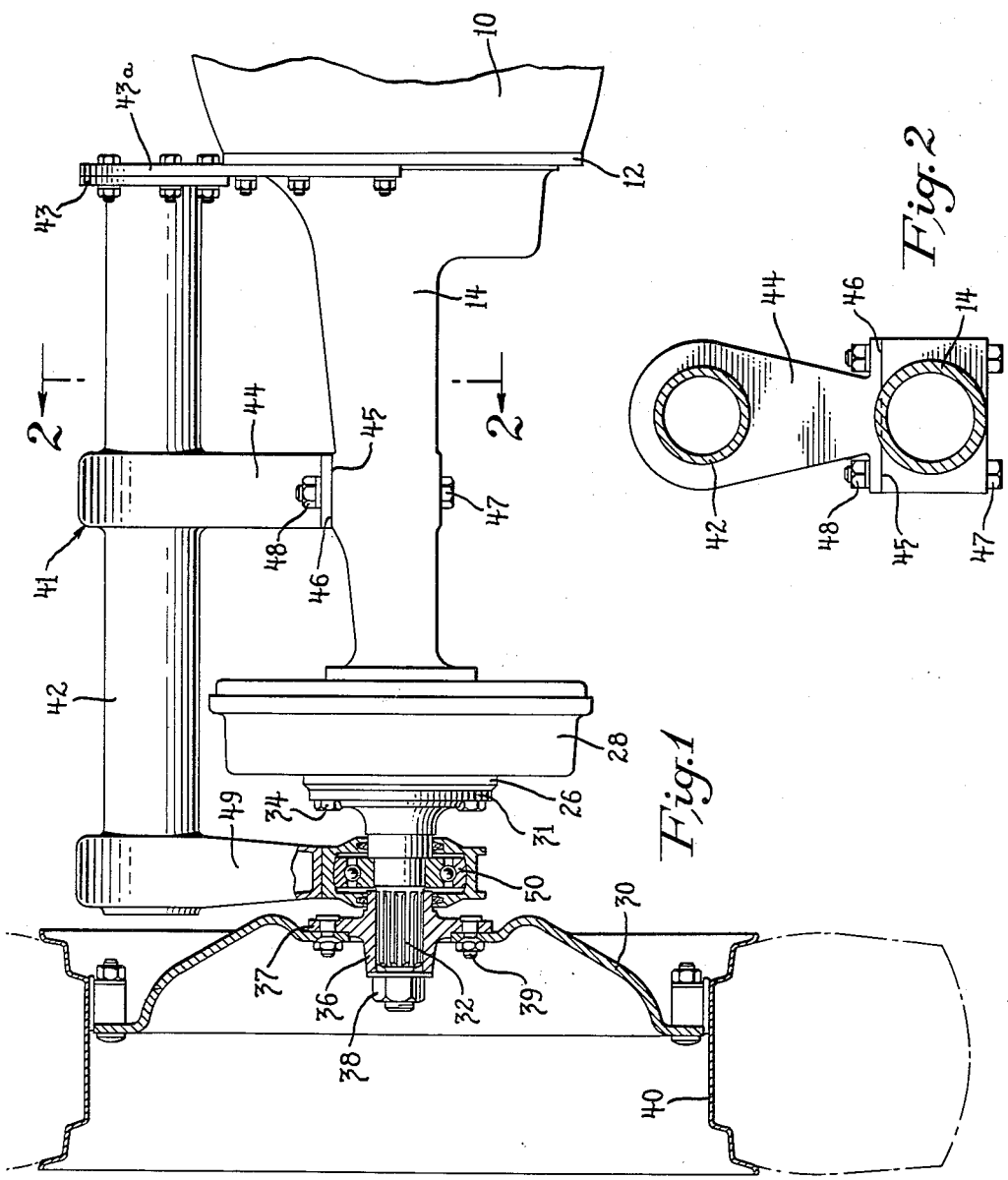

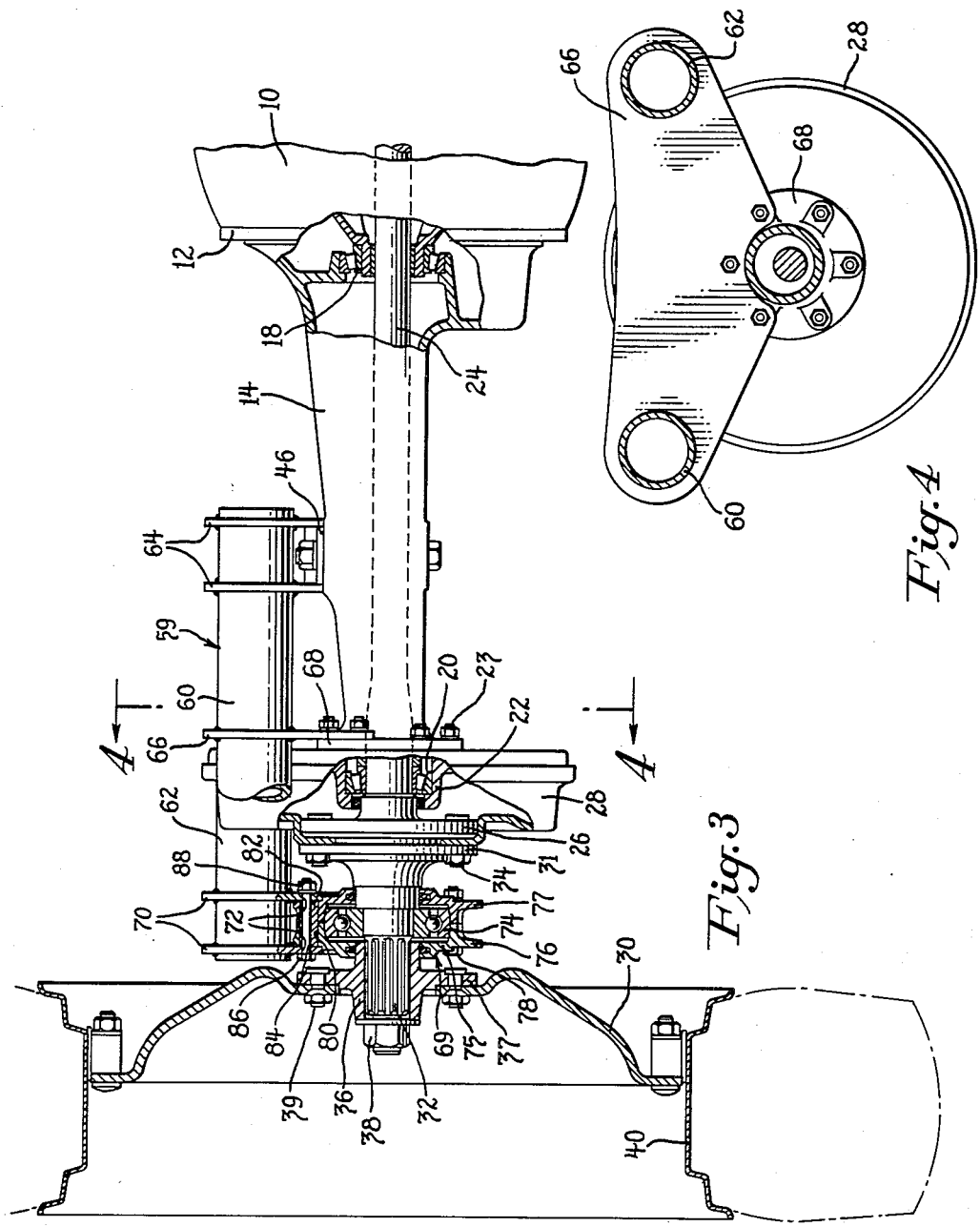

2,741,323

RIGIDIFYING SUPPORT FOR AXLE MOUNTING EXTENSION

Alexander Senkowski and Jerzy Belkowski, Coventry, England, assignors to Massey-Harris-Ferguson Inc., Racine, Wis., a corporation of Maryland Application May 23, 1955, Serial No. 510,296

Claims priority, application Great Britain May 28, 1954

10 Claims. (Cl. 180—88)

This invention relates to tractive vehicles, and more particularly, to an axle extension and support therefor whereby a harvester or other implement may be fully mounted on the vehicle between the body proper and the wheels at one side.

When a harvesting unit is fully mounted on a vehicle, such as a tractor, and at one side thereof, a heavy laterally offset load is imposed on the rear axle at the side of the tractor on which it is mounted. This is especially true where the unit, as in the present case, is mounted wholly within the tread of the tractor wheels and the axle has been extended to accommodate the unit and the wheels set for maximum tread width.

It is therefore an object of the present invention to provide a support structure for an extended axle of a tractive vehicle, which is rigidly secured to the vhicle frame at two locations and which supports the extended axle at its outer end thereby minimizing the bending stresses imposed on the axle.

It is a more specific object of the invention to provide a support structure of the above type which has means for compensating for manufacturing tolerances to insure that bending stresses will be relieved when the structure is fully assembled and a load imposed thereon. This means may also be utilized to "preload" the axle in a direction opposite to that which it would assume in the loaded condition.

It is an object of the invention to provide an improved extended axle support structure for a tractor for fully mounting a harvesting unit within the tread of the tractive wheels.

Other objects and advantages will become more apparent from the following detailed description, taken in conjunction with the attached sheets of drawings on which, by way of preferred example only, is illustrated one embodiment of this invention.

In the drawings:

Figure 1 is an elevational view, partially in section of one form of the invention.

Figure 2 is an elevational cross sectional view taken on line 2—2 of Figure 1.

Figure 3 is an elevational view, partially in section and with certain parts broken away for clarity in the drawings, of a modification of the invention.

Figure 4 is an elevational cross sectional view taken on line 4—4 in Figure 3.

Referring more particularly to the drawings, to the conventional rear differential gear casing 10 of the tractor is bolted the flange 12 of the conventional trumpet-shaped half-axle casing 14, thus forming part of a tractor frame. Casing 14 has an inner axle bearing 18 (Fig. 3) and an outer axle bearing 20, the latter of which is mounted on portion 22 which in turn is secured by bolts 23 to the casing 14 and forms an integral part thereof. A half-axle 24, commonly referred to as a "live axle," is rotatably mounted in the inner and outer bearings, 18, 20 and has formed therewith, at its outer end, the conventional axle flange 26. The brake drum casing 28 is bolted directly to flange 26 and in conventional practice the ground wheel disc 30 would be also bolted directly to the drum casing 28.

In accordance with the present invention, however, the flange portion 31 of stub axle 32 is secured by bolts 34 to drum casing 28 and axle flange 26. A hub 36 having a radial flange 37 is splined to the stub axle 32 and secured thereon by the nut 38 threadably engaged on the end of the stub axle. The wheel disc 30 is secured by bolts 39 to hub 36 and the tire carrying rim 40 is secured to wheel flange 30 in the position affording maximum rear wheel tread. Thus an extension is formed for the live axle 24 which extends the axle in a lateral direction beyond bearing 20.

This extended live axle must support considerable weight, and it is therefore subjected to a great deal of bending, especially between the inner and outer bearings 18, 20, respectively, which often results in axle breakage.

Novel support structure is provided for this live axle which reduces this bending stress and by means of which a preload or prestress can be applied if necessary, to the axle in the opposite direction to the eventual loading due to the weight of the mounted harvester.

Referring to Figures 1 and 2, an elongated support structure 41 is provided comprising a tubular member 42 having a flange portion 43 at its inner end which is bolted to an upstanding plate 43a which in turn is rigidly bolted to the differential gear casing 10. Intermediate the length of support structure 41 is a downwardly depending portion in the form of a pedestal 44 which terminates at its lower end in a flat surface 45 where it abuts against and is secured by bolts 47 and nuts 48 to the customary flat facing 46 located on an intermediate portion of axle casing 14. The support structure 41 is positioned sufficiently high so as to extend above the brake drum casing 28. At the outer end of support structure 41 and rigidly secured, as by welding, to the tubular member 42 is a downwardly extending arm 49 having at its lower end a ball bearing assembly 50 in which is rotatably supported the stub axle 32. Thus, an elongated support structure is provided which is rigidly secured to the tractor frame at its inner end and at an intermediate portion of its length and which provides at its outer end a rigid bearing support for the extended live axle.

Assume the support structure 41 is dimensioned so that, when attached as shown in Figures 1 and 2, the structure 41 is substantially unstressed when the bolts 48 are tightened. When some form of heavy laterally offset load is applied to the structure the downward force due to the combined weights of the tractor and offset-load is applied to the axle not only at the inner and outer bearings 18, 20 (Fig. 3), but also at the bearing 50 which serves to distribute the stress more uniformly and to relieve the bending stress in the half-axle between bearings 18, 20, more particularly in the vicinity of bearing 20.

Provision can be made for distributing the bending stress even more advantageously and the possibility of preloading the axle 24 may be accomplished as follows. If the structure 41 is so dimensioned so the surface 45, while the parts are unstressed, comes short of the facing 46, thus leaving a slight clearance, the final tightening of nuts 48 has the effect of taking up any play due to manufacturing tolerances of the various component parts thereby insuring that there is no deflection of the half-axle before the load is taken by the bearing 50. By making the clearance between surface 46 and facing 45 of sufficient magnitude, the final tightening of nuts 48 after both ends of the structure are finally in place, may be sufficient to preload the axle in an opposite direction from that due to the load it must eventually support.

The embodiment of the invention shown in Figures 3 and 4 is the same in function as that shown in Figures 1 and 2. An elongated support structure is rigidly secured at its inner and intermediate portions to the tractor frame and has an overhanging or outer portion which supports the stub axle. Provision is also made in this embodiment to compensate for manufacturing tolerances and to afford preloading of the axle. The support structure 59 in this embodiment comprises two parallel tubular members 60, 62, one of which is located on either side of the brake drum casing 28 is a fore and aft direction. A double plate pedestal 64 rigidly supports the inner end of structure 59 on the facing 46 and a downwardly extending portion in the form of an intermediate plate 66 rigidly connects the structure 59 to the flange 68 of the axle casing 14. A downwardly extending arm 69 connects tubular members 60, 62 with the axle as follows. Double plates 70 are welded to the outer end of tubular members 60, 62 and extend downwardly therefrom and have aligned apertures 72 extending therethrough. A stub axle bearing assembly 74 is supported in the bearing hanger 75 which is comprised of complementary halves 76, 77 secured together by bolt and nut means 78. The upper portion of hanger 75 has a bore 80 extending therethrough in which is mounted a sleeve 82. An eccentric hole 84 is drilled through sleeve 82 which is aligned with apertures 72 in plates 70. A bolt 86 extends through apertures 72 and hole 84 and is secured therein by nut 88. By turning sleeve 82, before tightening nut 88, the vertical distance between stub shaft 32 and the tubular member 60, 62, may be varied, thereby providing for preloading the axle or variation in manuaftcuring tolerances as heretofore described.

In either embodiment, the support structure may be utilized to mount a harvester or other load imposing implement directly thereon.

What is desired to be secured by Letters Patent is:

1. In a tractor having a frame including an axle casing extending laterally at one side of said tractor, said casing having inner and outer axle bearings, an axle rotatably mounted in said bearings and having an outer end extending laterally beyond said outer bearing, a ground wheel secured at the outer end of said axle, the improvement comprising; a support structure positioned above and adjacent to said axle casing and rigidly secured intermediate its length to said casing and at its inner end to said frame and having an outer end terminating adjacent said outer end of said axle, said axle at its outer end being rotatably supported in the outer end of said structure.

2. In a tractor having a frame comprising a rear differential gear casing and a rear axle casing rigidly secured thereto and extending laterally outwardly therefrom, said axle casing having inner and outer axle bearings, an axle rotatably mounted in said bearings and having an outer end extending laterally beyond said outer bearing, a ground wheel secured at the outer end of said axle, the improvement comprising; an elongated support structure positioned above said axle casing and rigidly secured intermediate its length to said axle casing and at its inner end to said frame and having an outer end terminating adjacent said outer end of said axle, said axle at its outer end being rotatably supported in the outer end of said structure.

3. In a tractor having a frame comprising a rear differential gear casing and a rear axle casing rigidly secured thereto and extending laterally outwardly therefrom, said axle casing having inner and outer axle bearings, an axle rotatably mounted in said bearings and having an outer end extending laterally beyond said outer bearing, a ground wheel secured at the outer end of said axle, the improvement comprising; an elongated support structure positioned above said axle casing and rigidly secured intermediate its length to said axle casing and at its inner end to said frame and having an outer end extending laterally beyond said outer end of said axle, said structure including a downwardly extending arm at its outer end in which the outer end of said axle is rotatably supported.

4. In a tractor having a frame comprising a rear differential gear casing and a rear axle casing rigidly secured thereto and extending laterally outwardly therefrom, said axle casing having inner and outer axle bearings, an axle rotatably mounted in said bearings and having an outer end extending laterally beyond said outer bearing, a ground wheel secured at the outer end of said axle, the improvement comprising; an elongated support structure positioned above said axle casing and rigidly secured intermediate its length to said axle casing and at its inner end to said differential gear casing and having an outer end terminating adjacent said outer end of said axle, said axle at its outer end being rotatably supported in the outer end of said structure.

5. A device as defined in claim 4 further characterized in that said structure has a downwardly depending pedestal intermediate its length which is adapted to be secured to said axle casing and a downwardly extending arm at its outer end in which said axle is rotatably supported.

6. In a tractor having a frame comprising a rear differential gear casing and a rear axle casing rigidly secured thereto and extending laterally outwardly therefrom, said axle casing having inner and outer axle bearings, an axle rotatably mounted in said bearings and having an outer end extending laterally beyond said outer bearing, a ground wheel secured at the outer end of said axle, the improvement comprising; a support structure positioned above said axle casing and rigidly secured intermediate its length to the outer end of said axle casing, and at its inner end to an intermediate portion of said axle casing, and having an outer end terminating adjacent said outer end of said axle, said axle at its outer end being rotatably supported in the outer end of said structure, said structure comprising a tubular member located on each of the fore-and-aft sides of said axle casing.

7. A device as defined in claim 6 furhter characterized in that said structure includes a downwardly extending arm at its outer end in which the outer end of said axle is rotatably supported.

8. As an article of manufacture; an axle extension support structure for a tractor having a frame including an axle casing extending laterally at one side of said tractor, said axle casing having an inner and outer axle bearing, an axle rotatably mounted in said bearings and having an outer end extending laterally beyond said outer bearing; said structure comprising, an inner end adapted to be rigidly secured to said frame, an intermediate downwardly depending portion adapted to be secured to said axle casing, a downwardly extending outer arm adapted to rotatably support said axle laterally beyond said axle casing.

9. In a tractor of the type having a frame including a rear differential gear casing and a rear axle casing rigidly secured thereto and extending laterally outwardly therefrom, said axle casing having inner and outer axle bearings, an axle rotatably mounted in said bearings and having an outer end extending laterally beyond said outer bearing, a ground wheel secured at the outer end of said axle, the improvement comprising; an elongated support structure positioned above said axle casing and having a downwardly depending pedestal intermediate its length which is adapted to be secured to said axle casing, said structure at its inner end secured to said differential gear casing and having an outer end terminating in a downwardly extending arm adjacent said outer end of said axle and rotatably supporting the latter, said axle at its outer end being rotatably supported in the outer end of said structure, and so constructed and arranged that when said structure is finally secured to said gear casing and to said axle, said pedestal is of such length as to not contact said axle casing until final securing of said pedestal to said axle casing whereby said axle will be prestressed in a direction opposite to that in which it is stressed in a loaded condition.

10. In a tractor, the combination of a frame having a rear differential gear casing and a rear axle casing rigidly secured thereto and extending laterally outwardly therefrom, said axle casing having inner and outer axle bearings, an axle rotatably mounted in said bearings and having an outer end extending laterally beyond said outer bearing, a ground wheel secured at the outer end of said axle, the improvement comprising; a support structure positioned above said axle casing and rigidly secured intermediate its length to the outer end of said axle casing, and at its inner end to an intermediate portion of said axle casing, and having an outer end terminating in a downwardly extending arm in which the outer end of said axle is rotatably supported, said structure comprising a tubular member located on each of the fore-and-aft sides of said axle casing, said arm including an eccentric adjustment whereby the vertical distance between said tubular members and said axle can be varied.

References Cited in the file of this patent

UNITED STATES PATENTS

| | | |
|---|---|---|
| 1,571,801 | Rockwell | Feb. 2, 1926 |
| 1,755,524 | Stanfield | Apr. 22, 1930 |
| 2,376,541 | Johnson et al. | May 22, 1945 |